3,169,069
PREPARATION OF PRE-COOKED FROZEN POULTRY PRODUCTS
Helen L. Hanson and Lorraine R. Fletcher, Berkeley, Calif., assignors to the United States of America as represented by the Secretary of Agriculture
No Drawing. Filed Apr. 24, 1961, Ser. No. 105,235
2 Claims. (Cl. 99—194)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel methods for preparing pre-cooked, frozen food products, particularly poultry, and the products so produced. Further objects of the invention will be evident from the following description wherein parts and percentages are by weight unless otherwise specified.

The invention is of particular advantage in the preparation of poultry products and its application in this field will be emphasized in the following description. It is, however, to be understood that the invention is not limited to poultry but is applicable to preparation of pre-cooked frozen food products of all kinds, illustrative examples being chicken, turkey, duck, rabbit, sea foods such as scallops, shrimp, fish fillets or "sticks," beef steaks, ground meat patties, pork chops, simulated chops (prepared by molding ground meat into suitable shapes), frog legs, eggplant slices, onion rings, and the like.

In the conventional manufacture of pre-fried frozen food products the following procedure is employed: The fresh food material, typically cut-up chicken, is coated with a batter, for example, a mixture of flour, milk, eggs, and seasoning. The batter-coated chicken pieces are then fried in fat. When the flesh is properly cooked the chicken is removed from the hot fat, drained, packaged in suitable containers, frozen and maintained in frozen storage until it is to be prepared for the table. A prime disadvantage in this procedure is that the batter coating does not adhere properly to the food pieces. Thus when the product is removed from the carton, transferred to the oven for heating, or otherwise handled, the batter flakes or peels off in large sections, producing an unsightly nonuniform product. Attempts have been made to control this defect by variations in the components of the batter, as by using flours from different cereals or by changes in the relative proportions of flour, egg and liquid. These changes, however, have not produced any significant alleviation of the problem.

In accordance with the invention, a technique is employed which completely solves the problem of batter flaking or peeling. In the products of the invention the batter or other equivalent farinaceous coating clings tenaciously to the food pieces so that there is no flaking of the coating on handling whether in removing the products from the containers, manipulating them on trays for heating or eventual handling to serve them at the table.

In essence, the process of the invention involves the following sequence of operations: The fresh, raw produce (typically chicken pieces, onion rings, eggplant slices, or the like) is first cooked. This cooking may be done in boiling water, by application of steam, by application of hot air as in an oven, by subjecting the produce to radiant heat, or by frying in fat. In a word, the cooking is done by any conventional technique well known in the culinary arts. When the produce is cooked to a desirable degree of tenderness or doneness, it is coated with a batter or an equivalent material, that is, with farinaceous material in solid or liquid form. The type of coating used is largely a matter of taste or appearance. The usual types of batters containing flour, milk, egg, and seasoning are a typical example. Another type of coating is obtained by dredging the produce with a dry mixture of flour, cornmeal, bread crumbs, or the like, and seasonings. Where a dry mix is used it is obvious that the produce should have a moist surface so that the dry ingredients will adhere thereto. Where the produce has a dry surface it may be sprayed with water or with a composition of milk or water and egg to secure a better adherence. All these matters of composition of batters and methods of applying them are well known in the cooking art and no invention is claimed in them per se with the exception of certain batters containing waxy rice as described hereinafter. Following application of the farinaceous coating to the cooked produce, it is then fried in fat. This frying operation is continued only long enough to cause the farinaceous coating to assume a golden-brown color, that is, a typical appearance of conventional fried products, as for example the typical color of French fried potatoes. This frying operation involves a very brief time of contact between the coated food product and the hot fat. The exact time required in any particular case will depend on such factors as the temperature of the fat and type of coating. In operating the process, the proper time of frying can easily be gauged by the appearance of the material under treatment, the operation being discontinued when the desired color is established. In typical applications of the process to chicken pieces the fat is held at a temperature of about 300 to 400° F. and the time of contact is about 30 to 120 seconds, depending on the temperature. After the frying operation, the food material is removed from the fat, drained, cooled, packaged, and frozen in conventional manner and held in frozen storage until ready for consumption. The frozen products may aptly be described as cooked solid food material encased in an independently-cooked, tightly-adherent pellicle of farinaceous material. As mentioned above, with the products so prepared the farinaceous coating adheres tightly to the food pieces so that there is no loss of coating on handling of the product. A critical aspect of the process of the invention is that the food material is cooked before the coating is applied thereto. In this way one avoids the detrimental events which take place when a coated raw food product is fried. Thus in conventional operation— frying of the coated raw food—the food material shrinks and emits steam, both of these actions tending to loosen the bond between the food and the pellicle of coating material and lift the pellicle away from the surface of the food. Where, however, the food is first cooked and then the coating is applied, these loosening and lifting effects cannot take place. It may further be observed that the final frying in fat of the present invention is a brief procedure merely used to give the coating the proper coloration and during this operation, there is no significant loosening of the farinaceous pellicle.

As explained hereinabove the farinaceous material used to coat the food pieces may be any of the usual preparations used for such purposes. Thus the coating may be applied in a dry or a liquid state and its prime component may be such materials as wheat flour, corn flour, potato flour, cornmeal, bread crumbs, cracker crumbs, or various mixtures thereof. Where a liquid preparation is used the liquid may be water, milk, or milk diluted with water. Egg materials—fresh or dehydrated—may be incorporated to provide a bonding agent. Suitable seasonings such as salt, pepper, etc., may be added as desired. It has further been observed that batters prepared with waxy rice flour possess particularly desirable properties as during frozen storage of the prepared food product the batter coating retains its original texture and does not exude any watery serum as is often the case with batters prepared with other farinaceous materials such as wheat flour, corn flour, potato flour, or the like. Thus, by use of batters containing waxy rice flour a further improvement is achieved in that the coating on the food product is rendered stable against phase separation. Waxy rice is a particular type or variety of rice botanically known as *Oryza glutinosa*. In utilizing this modification of the invention, the batter is prepared with waxy rice flour as the sole farinaceous component or it may be admixed with other farinaceous materials such as wheat flour, corn flour, potato flour, normal rice flour, cornmeal, starch, or the like to provide a composition containing at least 25% of waxy rice flour. In preparing a batter for application to the pre-cooked food, waxy rice flour or the mixture thereof with other farinaceous material is incorporated with an edible liquid such as water, milk, or milk diluted with water. Egg material—fresh or dry—may be added as well. Conventional seasonings such as salt and pepper to taste are generally employed. The ratio of farinaceous material to liquid may be varied as desired. For example, a thin batter will produce a thinner coating than a viscous batter. Usually, the proportions are so regulated that the batter has approximately the consistency of cream. Although it is preferred to apply the waxy rice in the form of a batter one may apply the dry waxy rice flour, as such, or in admixture with other farinaceous material to the food pieces. In such event, the solid coating material may contain such added ingredients as dry milk, dried egg, seasonings, etc. In a typical application of the process a batter is prepared containing these ingredients:

| | Lbs. |
|---|---|
| Waxy rice flour | 50–75 |
| Dry skim milk | 2–10 |
| Dry whole egg | 2–10 |
| Salt to taste. | |

The above dry ingredients are mixed with sufficient water to make a smooth paste of a cream-like consistency.

The invention is further demonstrated by the following illustrative examples.

The batters referred to in the examples contained the following ingredients:

| Ingredient | Batter A | Batter B | Batter C |
|---|---|---|---|
| Waxy rice flour, percent | 37 | 0 | 0 |
| Wheat flour, percent | 0 | 37 | 0 |
| Mixture of 2 parts waxy rice flour and 1 part potato flour, percent | 0 | 0 | 37 |
| Fresh egg yolk, percent | 5 | 5 | 5 |
| Non-fat milk solids, percent | 1 | 1 | 1 |
| Salt, percent | 3 | 3 | 3 |
| Water, percent | 54 | 54 | 54 |

*Example I*

Raw chicken parts (legs, thighs, breasts, etc.) were cooked by simmering in water for 12 minutes. The cooked chicken parts were dredged with flour (2 parts waxy rice, 1 part potato flour) then the lot was divided into three batches, each being dipped in one of the batters described above.

The three batter-dipped batches of cooked chicken parts were separately deep-fat fried at 360° F. for 2 minutes to brown the batter coating. The products were then each packaged in aluminum pans covered with aluminum foil overwrap and frozen.

To test the products, they were heated in the closed containers in an oven at 400° F. for about 40 minutes. The products were then examined. It was found that the batter coatings were tightly adherent and could be peeled off only with difficulty and only by deliberate effort to do so.

*Example II*

Raw chicken parts (legs, thighs, breasts, etc.) were cooked by roasting in an oven at 400° F. for 25 minutes. The cooked chicken parts were dredged with flour (2 parts waxy rice flour, 1 part potato flour), then the lot was divided into three batches, each being dipped in one of the batters described above.

The three batter-dipped batches of cooked chicken parts were then separately deep-fat fried at 360° F. for 2 minutes to brown the batter coating. The products were then each packaged in aluminum pans covered with aluminum foil overwrap and frozen.

To test the products, they were heated in the closed containers in an oven at 400° F for about 40 minutes. The products were then examined. It was found that the batter coatings were tightly adherent and could be peeled off only with difficulty and only by deliberate effort to do so.

*Example III*

Raw chicken parts (legs, thighs, breasts, etc.) were cooked by deep-fat frying at 293° F. for 10 minutes. The cooked chicken parts were dredged with flour (2 parts waxy rice flour, 1 part potato flour), then the lot was divided into three batches, each being dipped in one of the batters described above.

The three batter-dipped batches of cooked chicken parts were then separately deep-fat fried at 360° F. for 2 minutes to brown the batter coating. The products were then each packaged in aluminum pans covered with aluminum foil overwrap and frozen.

To test the products, they were heated in the closed containers in an oven at 400° F. for about 40 minutes. The products were then examined. It was found that the batter coatings were tightly adherent and could be peeled off only with difficulty and only by deliberate effort to do so.

COMPARATIVE TEST

The following test is not representative of the invention but is included for comparative purpose to illustrate the inferior results obtained with prior techniques.

Raw chicken parts (legs, thighs, breasts, etc.) were dredged with flour (2 parts waxy rice flour, 1 part potato flour), then the lot was divided into three batches, each being dipped into one of the batters described above.

The three batches of batter-dipped raw chicken parts were then separately deep-fat fried at 293° F. for 10 minutes. These cooked products were each packaged in aluminum pans, covered with aluminum foil overwrap and frozen.

To test the products, they were heated in the closed containers in an oven at 400° F. for about 40 minutes. The products were then examined. It was found that the batter coatings were not adherent to the surface of the chicken but raised slightly therefrom. Also, the batter coating flaked off the chicken parts on handling, for example, in transferring the product from the containers in which they were heated to serving plates.

Having thus described the invention, what is claimed is:

1. The method which comprises subjecting raw, solid, uncoated poultry pieces to cooking until tender, coating the cooked poultry pieces with a farinaceous substance, frying the coated, cooked poultry pieces in hot fat for a brief period of time sufficient only to develop a gold-brown coloration in the coating, cooling the fried product, freezing it and maintaining it in frozen storage, whereby said step of cooking the raw, solid, uncoated poultry pieces until tender enables said pieces to tightly retain the farinaceous coating thereon so that there is no loss of coating on subsequent handling of the product, said frozen product comprising cooked poultry pieces encased in an independently-cooked, tightly-adherent pellicle of farinaceous material which is resistant to flaking and peeling on subsequent handling.

2. The method of claim 1 wherein the farinaceous material is waxy rice flour.

References Cited by the Examiner
UNITED STATES PATENTS

| | | | |
|---|---|---|---|
| 2,653,876 | 9/53 | Hanson et al. | 99—194 X |
| 2,709,658 | 5/55 | Buchanan | 99—194 |
| 2,716,608 | 8/55 | Renish | 99—194 |
| 2,724,651 | 11/55 | Hampton et al. | |
| 3,041,178 | 6/62 | Marvin et al. | 99—195 |

A. LOUIS MONACELL, *Primary Examiner.*

HYMAN LORD, *Examiner.*